Patented May 22, 1951

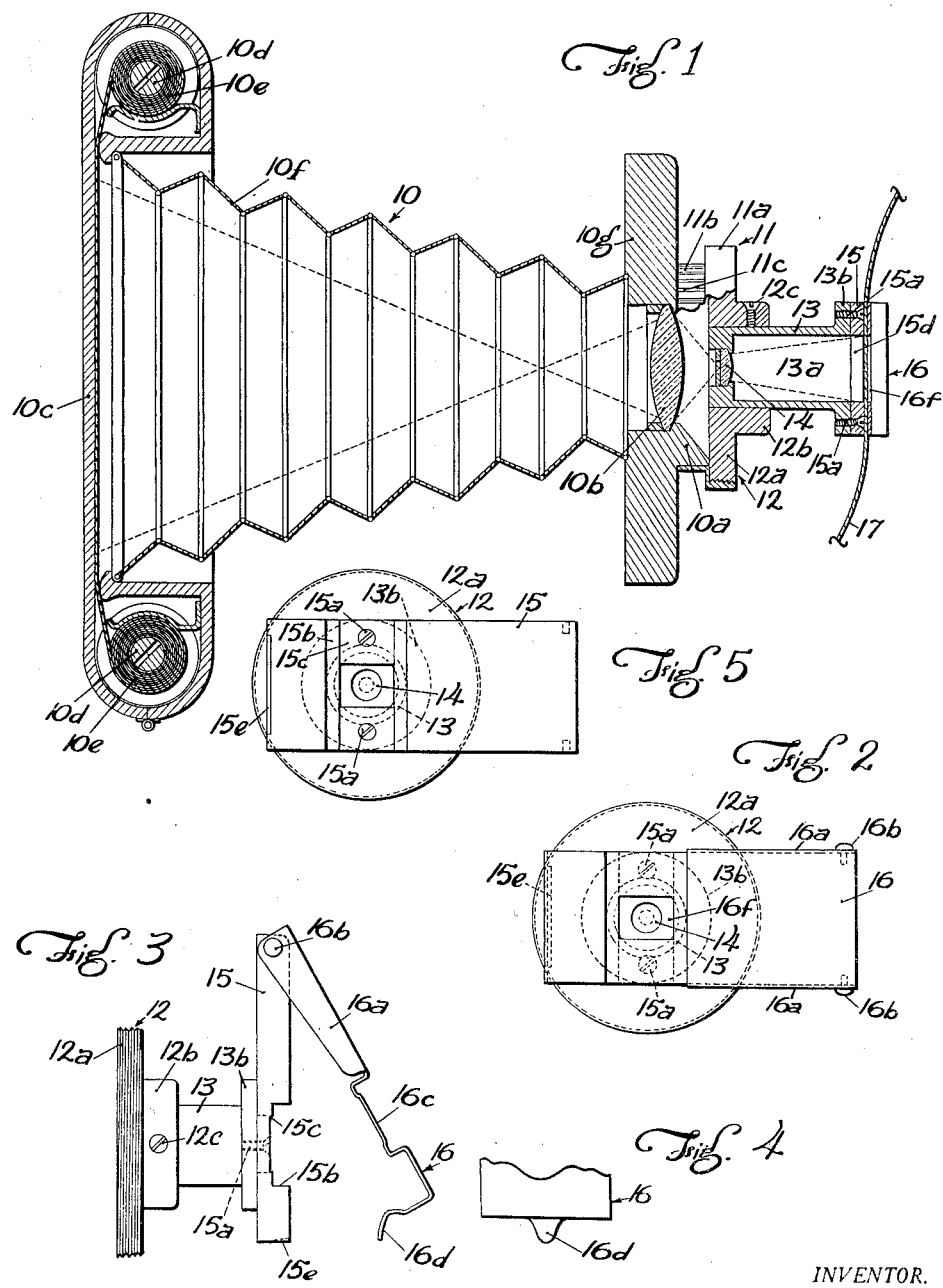

2,553,661

UNITED STATES PATENT OFFICE 2,553,661

ATTACHMENT FOR CAMERAS

Morton Liss, Minneapolis, Minn.

Application November 18, 1948, Serial No. 60,763

3 Claims. (Cl. 88—24)

1

This invention relates a device for making enlarged negatives of a small film or of single frames from a strip of motion picture film. It is often desired to make separate pictures of individual frames on a motion picture film. It is desirable therefore to have a simple and efficient means by which this can be quickly and conveniently done.

It is an object of this invention to provide a device which can be readily attached to an ordinary camera by means of which a strip of film is held in position while an enlarged negative is made of one frame on the said strip of film.

It is another object of this invention to provide a device to be attached to a standard camera in which separate frames in a strip of film can be easily placed in position to permit an enlarged negative to be made of each frame so placed, the said device having means for clamping and holding said film in position.

It is a further object of this invention to provide a device which can easily be attached to a camera by a standard adapter and held in position by the same, the said device having a means for holding a strip of film so that an enlarged negative can be made of a single frame in a positive strip of film.

More specifically it is an object of this invention to provide a device adaptable to have a standard adapter secured thereto by means of which it can be readily attached to and supported by an ordinary camera, said device having a portion with a passage extending therethrough, a lens disposed in said passage, a portion at the other end of the said last mentioned portion having a slot adapted to receive a strip of film so that one frame of said film is aligned to one end of said passage together with a readily operable means for clamping said film in position.

These and other objects and advantages of the invention will be fully set forth in the following description made in connection with the accompanying drawings in which like reference characters refer to the same parts throughout the different views, and in which:

Fig. 1 is a central vertical section through the device and through a camera to which it is attached;

Fig. 2 is a view in front elevation;

Fig. 3 is a view in side elevation;

Fig. 4 is a partial view in elevation as seen from the right of Fig. 3; and

Fig. 5 is a partial view similar to Fig. 2 with the clamping means removed.

Referring to the drawings, a camera 10 is

2 shown. This is a common type camera having a cylindrical lens holder 10a and a camera lens 10b held in position in said lens holder, as shown in Fig. 1. The casing 10c of the camera is shown together with the spools 10d on which the film 10e is wound. The bellows 10f extend from the casing 10c to the front plate 10g of the camera.

The applicant's device attached to this camera, as shown in Fig. 1, comprises a member 12 having an end portion 12a in the shape of a circular disc and a cylindrical hub portion 12b. The said disc portion 12a is threaded on its periphery. An adapter 11 is shown in position attached to the lens holder 10a. This is a standard type of adapter. The cylindrical portion 11a is interiorly threaded and adapted to be screwed on the circular threaded disc portion 12a of the applicant's device. The adapter 11 has a reduced cylindrical flange 11b. The said flange is provided with a multiplicity of slots 11c circumferentially spaced thereabout and thereby made resilient and said flange is adapted to be pressed onto the cylindrical lens holder 10a at the front of plate 10g. The adapter is thus frictionally held and supported on portion 10a.

Extending away from portion 12 is the tubular portion 13. The portion 12 is bored to fit over said tubular portion and is slidable longitudinally thereon. The means 12c illustrated as a set screw is provided to hold said portion 12 in a given position on said tubular portion. The said tubular portion has an enlarged cylindrical portion 13b at its other end and said portions have a passage 13a therethrough. Adapted to be held in said passage is lens 14. An elongated portion 15 is fastened to the last mentioned cylindrical portion 13b by means 15a which in the embodiment of this invention are shown as screws. Portion 15 is of rectangular form in plan and transverse section. A slot 15b extends transversely of portion 15 and a second shallow slot 15c is formed in the bottom of slot 15b constructed and arranged to receive a strip of film 17. The inner channel 15c is provided with an opening 15d in alignment with the passage 13a and lens 14. A clamp or clamping means 16 is provided made of thin sheet material which has side portions 16a which extend along the sides respectively of portion 15. The said clamping means is pivotally secured at its end adjacent one end of portion 15 by rivets 16b extending through the sides thereof and into the sides of portion 15. The clamping means has a channel portion 16c formed thereon and extending transversely thereof adapted to be received in the slot 15b. The said clamping means 16 extends to the end of portion 15 and along one end thereof and has a terminal finger piece 16d. The end of portion 15 is slightly beveled or chamfered, as shown at 15e. The free end portion of member 16 is resilient and adapted to snap over the end 15e. The member 16 has an opening 16f therethrough in alignment with the opening 15a, as shown in Fig. 2.

In operation, the device comprising parts 12 to 16 is attached to a standard camera by the standard adapter 11 as shown and described. The attaching portion 12 is slidable longitudinally on the tubular portion 13 to determine the proper focus and the said attaching portion can be held in a given position thereon by the tightening set screw 12c.

A strip of film 17 is placed in position as in Fig. 1 by fitting the same in the inner slot 15c with one frame of the said film located directly over the opening 15d. The clamp 16 is then swung into clamping position with the channel portion 16c disposed in slot 15b and this frictionally holds the said film firmly in place. The clasping means 16c frictionally and resiliently grips the beveled end portion 15e of the portion 15 to hold member 16 in clamping position. A single frame of the said strip of film is thus held in focus over the opening 15d and in alignment with the lens 14 in the tubular portion 13 and with the camera lens 10b. The shutters in the camera can then be opened to have an impression of the frame thus held in focus made on the negative film in the camera.

To change the individual frame of the strip of film thus held in alignment with the camera in this device, the clamp 16 is raised to release the film. The said film is then moved in the slot 15c to place the next frame in position directly over the opening 15d. The said film is held in proper alignment in slot 15c. The clamp 16 is then again swung to clamping position for holding the said film firmly in place.

From the above description it will be seen that I have provided a simple and convenient means for making enlarged negatives of small films or of individual frames in a strip of motion picture film. This film holding device to be used with any common type camera having a cylindrical lens holder is readily attached to the same by means of a standard adapter. The film is placed in a slot which holds it in proper alignment and a simple clamping means holds it securely in position while the camera shutters are opened to register an impression upon the roll of film in the camera.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. An attachment for a camera embodying the usual lens comprising a portion adapted to be secured to an adapter, a tubular portion, the said first mentioned portion fitting over said tubular portion and said tubular portion being movable longitudinally to different positions therein, means for holding said first mentioned portion in fixed position, a lens in said tubular portion, an elongated block-like member carried by said tubular portion, a channel extending transversely of said block-like member, a shallow slot in the bottom of said channel adapted to receive a strip of film, a member of sheet material pivotally attached at one end of said block-like member having portions extending along the sides of said block-like member, said last mentioned member having a channel extending transversely thereof adapted to be received in the channel of said last mentioned member to frictionally hold said film and having a resilient clasp at the other end thereof, a beveled slot-like portion at one end of said block-like member, said resilient clasp being adapted to be frictionally disposed over said beveled portion.

2. An attachment for a camera embodying the usual lens comprising a cylindrical portion, an adapter secured to said portion, a tubular portion having one end secured in said cylindrical portion and longitudinally movable to different positions therein, means for securing the same in different positions, said tubular portion having a reduced bore adjacent its inner end, a lens secured in said reduced bore portion, said lens being in alinement with said camera lens, said tubular portion having a rectangular portion integral with its outer end, a channel in said rectangular portion transversely thereof, a shallow slot at the bottom of said channel, an aperture in said slot alined with said bore and said lens, a clamping member of sheet material pivoted to one end of said rectangular portion, said last mentioned member having a channel transversely thereacross adapted to be received in said first mentioned channel, and a resilient clasp at the other end of said last mentioned member adapted to be frictionally disposed over one end of said rectangular portion.

3. An attachment for a camera embodying the usual lens having in combination, a member having a cylindrical portion, an adapter threaded on said member and pressed frictionally onto the projecting lens ring of an ordinary camera, a tubular portion, said cylindrical portion being fitted about said tubular portion and being longitudinally movable to different positions thereon, means for holding said portions in fixed position, a lens in said tubular portion, a rectangular plate-like member carried by said tubular portion and integral therewith, said plate-like member having a channel transversely thereacross, a slot in said channel adapted to receive a strip of film movable longitudinally therein and having a depth slightly less than the thickness of said film, said slot having an opening alined with the opening in said tubular portion, a clamp of sheet material pivotally secured to one end portion of said plate-like member, said clamp having a channel transversely thereacross adapted to be received in said first mentioned channel, a clasp frictionally securing said clamp whereby said film is frictionally held in said slot.

MORTON LISS.

REFERENCES CITED

The following references are of record in the file of this patent:

UNITED STATES PATENTS

| Number | Name | Date |
| --- | --- | --- |
| 1,885,555 | Schwartz | Nov. 1, 1932 |
| 2,172,246 | Hood | Sept. 5, 1939 |
| 2,199,305 | Dewey | Apr. 30, 1940 |
| 2,234,698 | Hughey | Mar. 11, 1941 |
| 2,346,096 | Whitaker | Apr. 4, 1944 |